(12) United States Patent
Loftman et al.

(10) Patent No.: US 8,690,781 B2
(45) Date of Patent: Apr. 8, 2014

(54) COHERENT IMAGE FORMATION FOR DYNAMIC TRANSMIT BEAMFORMATION

(75) Inventors: Rickard C. Loftman, Menlo Park, CA (US); Kutay F. Ustuner, Mountain View, CA (US); Charles E. Bradley, Berkeley, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 84 days.

(21) Appl. No.: 13/538,744

(22) Filed: Jun. 29, 2012

(65) Prior Publication Data

US 2012/0283568 A1     Nov. 8, 2012

Related U.S. Application Data

(62) Division of application No. 12/477,783, filed on Jun. 3, 2009, now Pat. No. 8,241,216.

(60) Provisional application No. 61/059,668, filed on Jun. 6, 2008.

(51) Int. Cl.
    *A61B 8/00*             (2006.01)

(52) U.S. Cl.
    USPC ............................................. 600/443; 600/447

(58) Field of Classification Search
    USPC ................................................ 600/443, 447
    See application file for complete search history.

(56) References Cited

U.S. PATENT DOCUMENTS

| | | | | |
|---|---|---|---|---|
| 4,398,539 A | * | 8/1983 | Proudian | 600/447 |
| 5,592,175 A | * | 1/1997 | Tayloe | 342/357.78 |
| 5,667,373 A | * | 9/1997 | Wright et al. | 600/443 |
| 5,790,073 A | * | 8/1998 | Tayloe et al. | 342/357.2 |
| 6,315,723 B1 | * | 11/2001 | Robinson et al. | 600/443 |
| 6,511,426 B1 | * | 1/2003 | Hossack et al. | 600/437 |

\* cited by examiner

*Primary Examiner* — Long V. Le
*Assistant Examiner* — Bo J Peng (57) ABSTRACT

Using parallel receive beamformation, sets of data representing locations in at least a common field of view are obtained, each set in response to a transmit with a spatially distinct phase front. The common field of view receive data are time aligned and amplitude weighted for retrospective transmit focusing and retrospective transmit apodization, respectively. A time offset is applied to the receive data for retrospective transmit focusing. The offset is selected to emulate shifting the transmit delay profile to be tangentially intersecting with the dynamic receive delay profile for each location which is the desired transmit delay profile. A weight is applied to the receive data for retrospective transmit apodization. The offset and weighted data representing a same location from different transmit events is coherently combined. The number of sets of data offset, weighted and combined may vary as a function of depth for dynamic transmit beamformation.

11 Claims, 5 Drawing Sheets

FIG. 1

FIG. 6 numGroup= 3, kabi=1, abiAlign=1, abiExtrap=0, gslSlip=1, gslSum=1, outsIncmp=6
```
     T   T   T
 -6  -5  -4
     -3  -2  -1              FIG. 2
          0   1   2
 u   u   s   d   d
``` numGroup= 3, kabi=2, abiAlign=1, abiExtrap=0, gslSlip=2, gslSum=1, outsIncmp=6
```
           T           T
 -3  +  + -2  +    + -1
            0  +    + 1  +    + 2         FIG. 3
       u    u       s       s       d       d
```

COHERENT IMAGE FORMATION FOR DYNAMIC TRANSMIT BEAMFORMATION

CROSS-REFERENCE TO RELATED APPLICATIONS

The present patent document is a divisional of co-pending U.S. application Ser. No. 12/477,783, filed Jun. 3, 2009, which is a non-provisional of U.S. application Ser. No. 61/059,668 filed Jun. 6, 2008, which are hereby incorporated by reference.

BACKGROUND

The present patent document relates to coherent combination of received ultrasound signals. In particular, coherent combination of receive data is provided for retrospective dynamic transmit beamformation.

Conventionally to generate a two-dimensional image, acoustic energy is transmitted along a plurality of scan lines sequentially. The transmit beam is focused at one location along the scan line. In response to each transmission, echo signals are received along the respective scan line. The receive beam is dynamically focused as a function of depth (time) along the scan line. Transmit focus is static, and receive focus is dynamic.

For more rapid acquisition, particularly for three-dimensional imaging, a broader transmit beam is formed. Echoes are dynamically received along a plurality of scan lines in response to the broader transmit beam. However, beam group artifacts and loss of signal-to-noise-ratio (SNR) may result. For greater numbers of receive beams formed for each transmit beam, a greater beam group artifact and a greater loss of SNR may result due to the static transmit focus.

Phase alignment and coherent processing of the receive data may reduce the beam group artifact. Coherent receive data representing the same locations but from two spatially adjacent transmissions are phase aligned to account for the difference in transmit focus. The phase alignment is based on the position of the transmit focus. After phase alignment, the data representing the same locations is then coherently combined.

The number of acquisitions may be reduced by interpolating data along scan lines. Received data representing different scan lines is phase aligned and combined to represent an intermediary scan line. However, artifacts due to the static transmit foci may still result.

BRIEF SUMMARY

By way of introduction, the preferred embodiments described below include methods, instructions, computer readable media, and systems for retrospective dynamic transmit beamformation in medical ultrasound imaging. Using parallel receive beamformation, sets of data representing locations in at least a common field of view are obtained, each set in response to a transmit with spatially distinct static phase front. The distinct static phase fronts are achieved through delay profiles steering and focusing at different locations. The common field of view receive data are time-aligned and amplitude-weighted for retrospective transmit focusing and retrospective transmit apodization, respectively. A time offset, such as of a cycle or more in some cases, is applied to the receive data for retrospective transmit focusing. The offset is selected to emulate shifting the transmit delay profile to be tangential with the receive delay profile for each location. A weight is applied to the receive data for retrospective transmit apodization. The weight is selected based on the desired transmit apodization profile. The offset and weighted data representing a same location from different transmit events is coherently combined. The number of sets of data offset, weighted and combined may vary as a function of depth for dynamic transmit beamformation.

In first aspect, a method is provided for retrospective dynamic transmit beamformation in medical ultrasound imaging. First and second transmit beams having first and second foci, respectively, are transmitted. The first focus is different than the second focus. First and second sets of multiple receive beams are generated in response to the first and second transmit beams, respectively. Each of the receive beams has coherent samples representing at least overlapping locations in a field of view. For each of a plurality of locations, an at least one cycle delay offset is applied to at least one of the coherent samples. The offset is a function of the first focus and a receive focus for the coherent sample. Coherent samples from the first and second sets are combined for each location after applying the offsets. The coherent samples representing each location are a function of the offset. An image representing the field of view is generated. The image is a function of the combined coherent samples.

In a second aspect, a computer readable storage medium has stored therein data representing instructions executable by a programmed processor for retrospective dynamic transmit beamformation in medical ultrasound imaging. The storage medium includes instructions for acquiring data from multiple pulse-echo acquisition events, each pulse-echo acquisition event corresponding to different transmit delay profiles, aligning the data with offsets, the offsets corresponding to a temporal shift in one of the transmit delay profiles to a tangential intersection with receive wavefronts for the data, combining the aligned data, and generating an image as a function of the combined data.

In a third aspect, a method is provided for retrospective dynamic transmit beamformation in medical ultrasound imaging. A plurality of transmit beams having different foci are transmitted. Sets of multiple receive beams are generated in response to the respective transmit beams. Each of the receive beams of a set has coherent samples representing different locations in a field of view. At least one receive sample of each receive beam set is common among the sets. For each location, an offset is applied to at least one of the coherent samples. Coherent samples from the sets are combined for each location after applying the offsets. A number of sets contributing data to be combined varies as a function of depth. An image representing the field of view is generated as a function of the combined coherent samples.

In a fourth aspect, a computer readable storage medium has stored therein data representing instructions executable by a programmed processor for retrospective dynamic transmit beamformation in medical ultrasound imaging. The storage medium includes instructions for transmitting a plurality of transmit beams having different foci, generating sets of multiple receive beams in response to the respective transmit beams, each of the receive beams having coherent samples representing locations in at least a same region in a field of view, for each location, retrospectively focusing the transmit beams to the location by altering the coherent samples, combining coherent samples from the sets for each location after retrospectively focusing, and generating an image representing the field of view, the image being a function of the combined coherent samples.

In a fifth aspect, an ultrasound image formation method is provided. A plurality of receive beam sets are formed. Each set uses echoes received in response to a transmit event with spatially distinct phase front and each set representing at least a common region as another set. Receive data for a plurality of the sets is aligned, in depth, prior to amplitude detection. A synthesized line is generated through pre-detection summation of depth aligned receive data.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF SPECIFIC EMBODIMENTS

In retrospective transmit focusing, signals from multiple acquisition events that are in-focus with respect to receive are added pre-detection (synthesized) to re-construct the signal that would have been received if acquired with a focused transmit at each. One way to achieve retrospective transmit focusing is to transmit with each element of the array in turn while receiving along the same ultrasound line or lines for each acquisition. Next, for each receive focus position and array element, the appropriate focusing delay is applied prior to summing the many signals. However, the number of transmit events required to sample the entire aperture is great, which may not be rapid enough, may have insufficient field strength for harmonic imaging, and may be susceptible to motion artifact.

In much the same way that there are many basis functions that can be used to decompose a signal (e.g. delta function for standard digitization, sinusoids for Fourier decomposition, etc.), there are many ways to acquire the lateral wave number content, or "look angles," that the available transmit aperture may contribute to the synthesis of transmit (and therefore round-trip) focus. This understanding, in conjunction with an acquisition scheme that progresses a group of receive focus beams along with a set of transmit aperture function "basis functions", provides a practical implementation of retrospective transmit focusing on a system capable of receiving multiple (e.g., several, tens or hundreds) receive beams in response to each transmit beam. The transmit focus synthesized for progressive scanning using the transmit array with spherical wavefront transmit delays (conventional focus, or virtual point source).

In one embodiment of retrospective transmit focusing, each sample representing each location is formed from signals received from multiple transmit-receive pulse echo receive events. The several pulse echo events have different transmit focusing delays. With large receive beam counts (e.g., several, tens or hundreds) per transmit and scanning in a progressive fashion, data from each transmit may be used in synthesizing several receive lines without having to re-do pulse echo receive events.

For synthesis, echo data is adjusted in time and possibly phase. For the synthesis of the focused transmit aperture, time only may be sufficient if applied at the ultrasound frequency. If applied at baseband, phase adjustment may be used in addition to time. Phase only correction may be insufficient to achieve substantial transmit aperture synthesis, though phase only correction may provide synthesis in some situations. The correction is a function of the transmit focusing delay, which is static for each pulse echo receive event, and the receive focusing delay, which is dynamic during the pulse echo receive event. The time correction is applied in the receive beamformer receive delay profile, providing accurate receive focusing delay for the corrected range. Alternatively, the time correction is applied after beamforming before or after demodulation. The phase difference that results from this difference in signal processing functions may be accounted for by phase adjustment.

Due to adjusting in time and/or phase, the most substantial part of the signals from the multiple events arrive in-phase with respect to echoes produced by backscatter from the current point of interest. The transmit and/or receive idealized focused wave front at time zero may be considered as a circle whose center is at the focus and that intersects the line origin at the transducer/body interface. The appropriate correction to apply for retrospective transmit focusing is then found conceptually by considering the current actual transmit used to acquired data and the to-be-synthesized delay for the current point of interest (i.e., location in the field of view). The to-be synthesized delay is built by addition of several different actual curves. To find the appropriate time correction, the actual curve is evolved until it intersects tangentially with the to-be-synthesized curve. This point of intersection lies along the line between actual and to-be-synthesized focus points, which simplifies the calculation. The time correction to shift the actual transmit delay is applied to the received data. The information that is contributed by the transmit wavefront is associated with the echoes whose actual wavefronts are aligned with the focused wavefront to within some tolerance. Rather than selecting a sample for the given location, a sample from a different location is selected based on the time correction.

More transmit events may contribute meaningfully to the synthesized output at shallow depths than at deep depths. The transmit events to be synthesized are controlled as a function of geometry. For example, range, and possibly line dependent scaling, is provided in the synthesis function. The scaling provides gradual transitioning of beams from "on" to "off." A transmit event ceases to be good for synthesis at deeper depths, because the source of those echoes as given by tangential intersection of actual and desired wavefronts is outside the extent of the array or aperture.

Any transmit delay profiles may be used. In the discussion below for FIG. 1, conventionally focused and spherical diverging transmit delay profiles are used. For small aperture probes having scan lines of common origin, circular delay profiles make for regularly spaced "look angles." However, other transmit delay profiles may be used. It is a matter of the mathematics to determine what time adjustment provides tangential intersection with the to-be-focused delay profile in order to make use of other transmit profiles.

Focused transmits are used in the example embodiment. Focused transmits keep the field strength and, therefore, harmonic levels reasonably high as compared to substantial defocusing. The foci may be positioned in or outside of the field of view. For example, the focal depth is greater than the field of view (e.g., deeper than the image depth). In other embodiments, defocused, plane waves or other transmit delay profiles are used.

Any scan format may be used, such as sector or vector format on small aperture probes, or linear format on large aperture probes. The concept is not specific to those cases. In small aperture probes, conventional focused and diverging spherical transmit delay profiles yield look directions for the contributed information that are regularly spaced and range-invariant for the sector format. Large aperture probes may be used. The probes may be one-dimensional or multi-dimensional arrays of elements.

Deficiencies in beamformer beam count may be compensated for by multiple pulse echo events. Multiple pulse echo events prior to advancing the scan in azimuth may be used to synthesize the transmit focus in the elevation dimension. If a scan is small enough in azimuth, it may be possible to use this method in both azimuth and elevation dimensions without incurring too much motion artifact. This method may be advantageous if compensating for speed of sound in the body that is different from the usual assumption (manually, adaptively, or otherwise), because a large part of this correction may be taken care of without actually changing transmit characteristics and therefore not involving acoustic output considerations.

Another way of expressing the retrospective transmit focusing is combining data from multiple pulse-echo acquisition events where the transmit delay profiles differ and the receive delay profiles are substantially the same except for a channel independent offset that creates substantially in-phase summation across the various transmit event data when considering a coherent target. Other features may be provided. The different transmit delay profiles may provide independent regions over the array where their slope is similar to the receive delay slope for each image location. The different transmit delays may provide substantially different focus laterally. The delay offset may be greater than a half-wavelength. A large offset may be used for synthesizing a transmit focus retrospectively where a smaller offset that may be appropriate for synthetic line interpolation may not work. The delay offset may be computed as the time evolution required to achieve tangential intersection between the actual transmit time zero wavefront and an actual propagation wavefront emanating from the point of interest and intersecting the line origin. The lateral spectral bandwidth may be made substantially more linear-phase due to the synthesis. In the frequency domain, the phase of the spectrum can be made linear over a large band of lateral frequencies. In k-space, retrospective transmit focusing provides more linear lateral spectral bandwidth than without the retrospective transmit. The synthesis count may be modulated as function of range. Lateral interpolation (analytic beam interpolation) may be provided with the synthesis operation, increasing the frame rate. The interpolation may be provided prior to synthesis for retrospective transmit focus.

Figure 1:
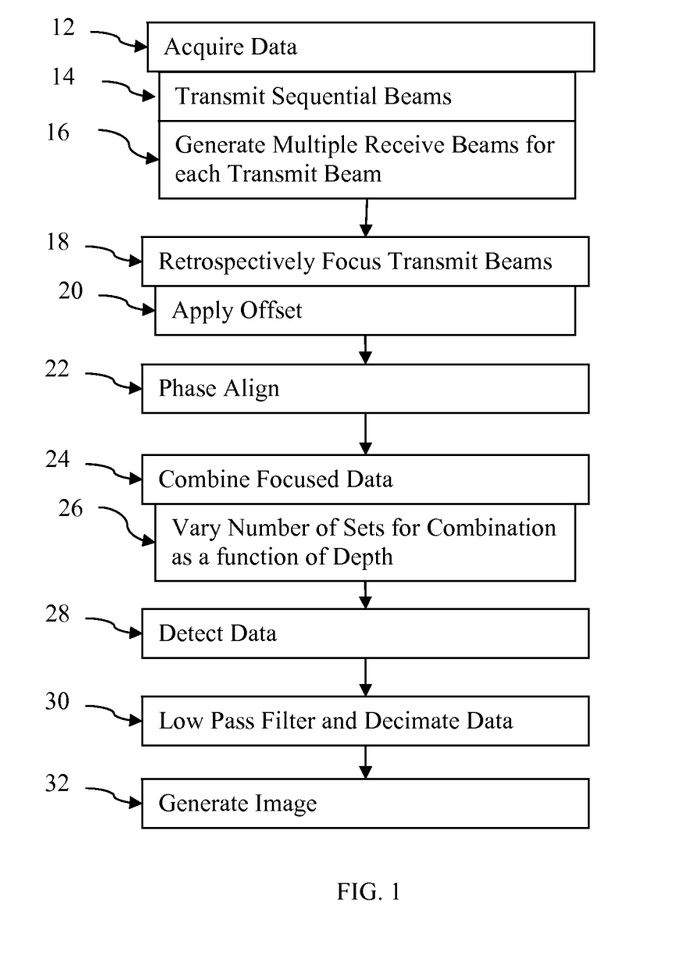
FIG. 1 is a flow chart diagram of one embodiment of a method for retrospective transmit focusing in medical ultrasound imaging.

FIG. 1 shows a flow chart for a method for retrospective transmit focusing in medical ultrasound imaging. The method is implemented by or on the system of FIG. 8 or a different system. Additional, different or fewer acts may be provided. For example in an embodiment, the method does not include act 22. As another example, the method does not include act 30 in an embodiment. The acts are performed in the order shown or a different order, according to various embodiments.

In act 12, data is acquired from multiple pulse-echo acquisition events. Each pulse-echo acquisition event corresponds to different transmit delay profiles and reception of a plurality of receive beams in response to each transmit beam. Two or more pulse-echo acquisition events are performed for forming a given image. The receive data generated from the pulse-echo acquisition events is processed by applying an offset and combining for retrospective transmit focusing. The acquisition is performed by transmission of ultrasound in act 14 and reception of responsive echoes in act 16.

In act 14, a plurality of statically focused transmit beams are transmitted. In one embodiment, the transmit beams are sequential. Sequential transmit beams allow for the reception of act 16 to occur with the same transducer array between transmitting each transmit beam. In other embodiments, the transmit beams are coded differently and transmitted simultaneously. The coding allows reception of data specific to the given transmit beam. Sequential transmit beams will be used below as an example.

At least two, and possibly all, of the transmit beams have different foci. The transmitted beam converges at the focal location. In alternative embodiments, plane waves or defocused waves (e.g., diverging wavefront) are used where the difference in foci correspond to different wave origins and/or directions. The different foci are provided by using different transmit delay profiles and corresponding channel delays and/or phasing. The transmit waveforms have different wavefronts due to the different foci. The same transmit aperture is used, but different transmit apertures may be provided for different transmit beams. For converging wavefronts, the different foci are at different locations, but may alternatively or additionally have differences in size and shape (e.g., line focus). The different foci are at different lateral locations. For example, the different foci are spaced in azimuth but at a same depth. Different depths may be used instead of different lateral locations or in addition to different lateral locations. The foci are within the field of view or imaging region. Alternatively, the foci are outside the field of view. For example, all of the foci are deeper than the field of view. The field of view of the image is between a transducer used for the transmitting and the foci. Rather than having an infinite focus (e.g., plane wave), the foci are within a patient or a region near the patient. For example, the foci are laterally spaced in azimuth and/or elevation within four times (e.g., at four times, at three times, at twice, or at 1.5 times) a depth of the field of view. In one example, the depth of the field of view is 18 cm and the focal depth is 45 cm.

The transmit beams propagate along a particular nominal transmit beam axis or transmit line to the respective focal location and beyond. Each transmit beam has an origin in common with other transmit beams, but may have a different origin (e.g., azimuthally spaced origin using a linear array). The transmit beams are non-collinear. The point spread function of the transmit beams may avoid substantial overlap at a given intensity (e.g., 6, 10, or 20 dB down from a maximum). Avoiding "substantial" overlap accounts for overlap used to receive along adjacent scan lines during a scan. The transmit beams may differ or be the same in one or more of the transmit beamforming and pulse shaping parameters, such as focal depth, center frequency, apodization type, aperture width, bandwidth or other transmit beam characteristic in addition to having distinct transmit lines.

In act 16, sets of multiple receive beams are generated in response to each respective sequential transmit beam. The receive beams are formed by dynamic focusing with receive beamformers. For each receive beam, different delay profiles are applied as a function of time or depth. The dynamic focusing results in coherent samples representing different locations in a field of view. Samples are provided along each of the receive beams.

Any number of receive beams and corresponding samples may be generated for a given transmit beam. For example, eight, sixteen or other number of receive beams are generated for a given transmit beam. The samples for the receive beams represent the ultrasound response along corresponding scan lines. The samples from a given transmit event are a set of data for that transmit. The scan lines are spaced apart in a scan region. The scan region is the entire field of view or only a portion of the field of view. For each given location in the field of view, a plurality of samples is provided. The receive beams from different transmissions may overlap or intersect. Multiple sets of receive data are available for each location, such as two, three, eight, sixteen or other numbers of sets being acquired for a given location.

In act 12, a scan sequence of acts 14 and 16 is performed to scan the field of view. For example, the scan sequence uses three transmit beams for a three-way synthesis. In one embodiment, three-way synthesis is provided at the maximum expected display depth where the component transmit focal length is close to the synthesized focal length so that the bandwidth contributed by each component is substantial. Forming an image over typical display depth ranges may use a greater number of receive beams for a given location so that the available transmit aperture may be fully represented in the synthesized output at each depth. In the near field, the bandwidth contribution of each component is small, and many acquisitions from many angles may be used. For example, eight, sixteen, or more samples are provided for each near field location for greater representation of the transmit aperture than provided using fewer samples. The maximum number of beams per group that contribute to synthesis may be limited by the simultaneous receive beam capability of the beamformer, but might also be limited by motion of the target object or a desired transmit F-number design choice.

Figure 2:
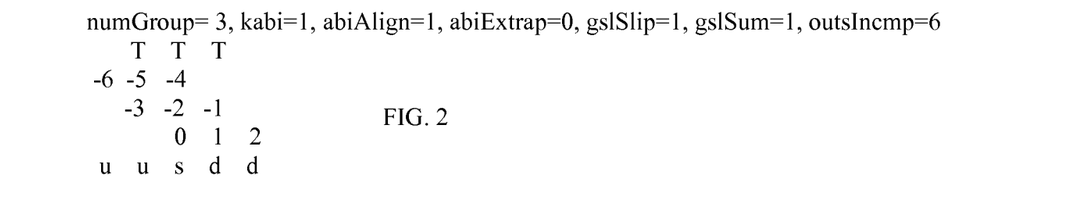
FIGS. 2 and 3 are example charts representing a data acquisition format.

One embodiment of a progressive scanning configuration for three-way synthesis is represented in FIG. 2. The parameters listed are a representation of the configuration. The capital letters "T" indicate component transmit nominal beam steering, the integers on each separate row indicate nominal lateral beam steering of each receive beam associated with a single acquisition event, relative to a first beam of the last event, the letters "u," "s," and "d" indicate the nominal beam steering of resulting synthesized ultrasounds beams of the ramp-up edge, steady-state scanning, and ramp-down edge, respectively. In this schematic representation, enough groups to show one steady-state acquisition are shown.

Other parameters correspond with pre-synthesis interpolation (e.g., Analytic Beam Interpolation, or ABI) alignment, represented as abiAlign, the extrapolation of beam group by conceptually padding receive beam group data with zero-value beams on each edge (abiExtrap), the receive beams acquired per group (numGroup), the number of post-abi beams which translate the beam group per acquisition (gslSlip), the numbers of ramp-up and ramp-down lines to be passed through the line synthesis operation (outsIncmp), and a number of acquisitions where the receive beam group does not translate (gslSum). Pre-synthesis interpolation may not be provided in other embodiments.

Figure 3:
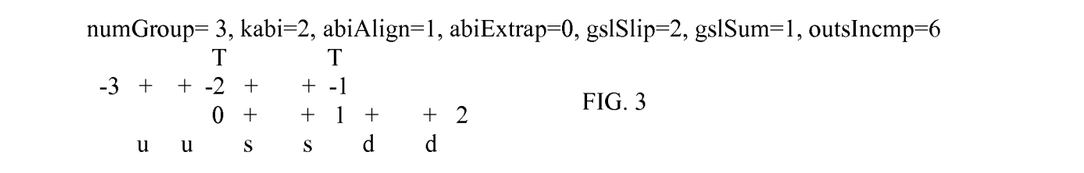

Scanning in the progressive fashion represented in FIG. 2 allows for effective use of a limited number of simultaneously acquired beam positions because the receive beams most aligned with transmit are acquired around each group and with as many additional receive beams as can be supported by the system, desired transmit F-number, or motion artifact constraints. The configuration depicted may not be an optimal one in terms of lateral sampling efficiency. FIG. 3 shows another example scan sequence with a pre-synthesis up-sampling design. The "+" symbols indicate the nominal beam steering positions of data interpolated from multiple receive beams of an acquisition. The interpolation is performed prior to synthesis so that interpolated receive beams are used in the synthesis. The scheme of FIG. 3 allows for the sampling density of the originally acquired multiple receive beams (indicated by integers in the above schematic) to be designed according to the lateral bandwidth of component images and subsequently up-sampled to support an increase in lateral bandwidth that is attendant to the retrospective transmit focus synthesis.

The interpolation scheme represented in FIG. 3 does not use the original receive beams, but instead relies only on the interpolated beams. The synthesized outputs, in terms of both the relative distances to beamformer beams and the number and scaling weights of those beam contributors to each interpolated output, may be more uniform. The original receive beams may be used in addition to the interpolated beams in other embodiments.

Other variations to the scan configuration may include alternate choices for translation of the beam group per acquisition and using the capability to sum acquisition events of different transmit characteristics without progressing the receive group. Varying the translation of the beam group per acquisition allows for the acquisition rate to be substantially modified in exchange for altering the characteristics of the round trip synthesized aperture function, and therefore the lateral point spread function for each beam, as well as the uniformity of this point spread function from across synthesized outputs. The capability to sum acquisitions without translating beam group allows for such operations as non-progressing transmit focus synthesis, which may be useful for synthesis in the plane perpendicular to the scanning direction. This method is applicable in volume scanning as well as planar. Due to target motion, progressive synthesis only in the direction of lateral scanning may be used and non-progressive synthesis may be used in the non-orthogonal direction. Alternatively, multiple acquisitions are used to compensate for an insufficiency of simultaneous receive multi-beam capability in the beamformer. Phase inversion or harmonic pulse sequence weighting using phase differences in the transmitted waves may be provided before or after synthesis for transmit focusing.

The receive beam density is set to sufficiently sample the information content of the individual acquisition components. For example, for small aperture transducers where the receive beams are spaced uniformly in angle or sine of angle, the beam spacing may be set to $\lambda/(2\,W)$ in radian, where $\lambda$ is the wavelength and W is the aperture size, both in units of mm. For transmit designs that do not contribute much lateral bandwidth prior to synthesis, this is a one-way focused imaging criterion. Indeed, the single component lateral bandwidth may be much less than the round-trip synthesized bandwidth, because in this situation the acoustic data is sampled according to the per-component bandwidth. Analytic beam interpolation (ABI) is used to prevent aliasing through the synthesis of the additional bandwidth due to the transmit focus and realize up to a factor of two acquisition rate advantage over conventional round-trip focusing.

With the receive beam spacing determined, the minimum transmit F-number that can be synthesized may be approximately determined by assuming that each acquisition contributes a narrow band of lateral wave numbers aligned with the look directions of the receive beams. The minimum synthesized F-number may be close to the inverse of two times the tangent of one less than the receive beam count times the receive beam spacing.

In act 18, the sequential transmit beams are retrospectively focused. The focusing is performed differently for each location in the field of view. Data from multiple sets of coherent samples are altered for retrospectively transmit focusing. Each set is associated with a different transmit beam and includes data from a plurality of locations. By altering the coherent samples associated with a given location, the transmit focus may be adjusted. The data for a given location is selected from data representing a different location.

In act 20, an offset is applied to the coherent samples for each location. The offset aligns the coherent data. For a given set, the samples are shifted in range to represent different locations based on the offset. For example, the locations may be shifted by a wavelength for a one cycle delay offset. The offset applied may be different for each location. One or more locations may be associated with no offset, such as at a transmit focal location. Alternatively, an offset is determined for each of the sets of data.

In the embodiment discussed above, the offset is applied to beamformed data. The offsets are delays. The delays may be one or more cycles. For some locations, less than a cycle delay may be used. A phase adjustment may be used for offsets of less than a cycle or for non-integer offsets (e.g., an integer cycle delay plus a phase offset). In other embodiments, the offsets are applied to channel data. Delays and/or phase adjustments are applied as offsets to the signals from each element prior to beamformation. The offsets may or may not be a single cycle or longer.

For a given location, the offset is a function of the transmit focus and the receive focus. The coherent sample in a given set of data associated with a transmit focus is selected using the transmit focus and receive focus relative to the location for which data is determined. By applying the offset to the samples, the data for retrospectively focusing is selected for the location. The offsets for the data from different sets for a given location correspond to temporal shifts in one of the transmit delay profiles to a tangential intersection with the focused delay profile for the data. Each data set contributes a portion of the retrospective focusing.

To understand what each component acquisition contributes to the synthesized signal, consider the Fourier transform model for focused apertures. Within the focal plane, the lateral point spread function is given by the Fourier transform of the apodization function. Within this formalism, the effect of defocusing in range is modeled by introducing a phase variation onto the apodization function that arises from the difference between the physical path-length to the target and that, which is assumed by the focusing delay calculation. This results in an integral suited to the method of stationary phase integration. The physical basis of which is the recognition that the main contributor to the integral result is the portion of the kernel over which the phase is stationary or non-varying. Extending this idea to the component transmits allows determination of the "look angle" for the lateral wave numbers or region of support of the apodization function in the Fourier transform model that are contributed by each acquisition, as well as estimate of the bandwidth contributed by each component. The look angle and magnitude of shift determine the advance or offset to apply prior to synthesis.

Figure 4:
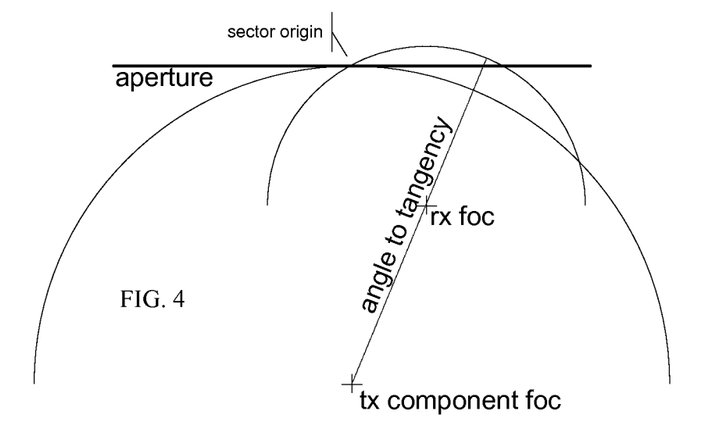
FIGS. 4 and 5 are graphical representations of one embodiment of determining an offset for receive data to retrospectively focus the transmit.

FIG. 4 shows the relationship between transmit and receive delay profiles for a given location, indicated as the receive (rx) focus due to dynamic receive operation. The array surface, a receive focus point and corresponding spherical wavefront corresponding to time zero, and a transmit (tx) focus point for the set of data (i.e., one component image) and corresponding spherical wavefront corresponding to time zero are shown. For spherical wavefronts, the line intersecting the two centers, or foci, also intersects the spherical wavefronts at the points where tangential or parallel intersection of spherical wavefronts for those foci occurs. This line is marked as the angle to tangency.

Figure 5:
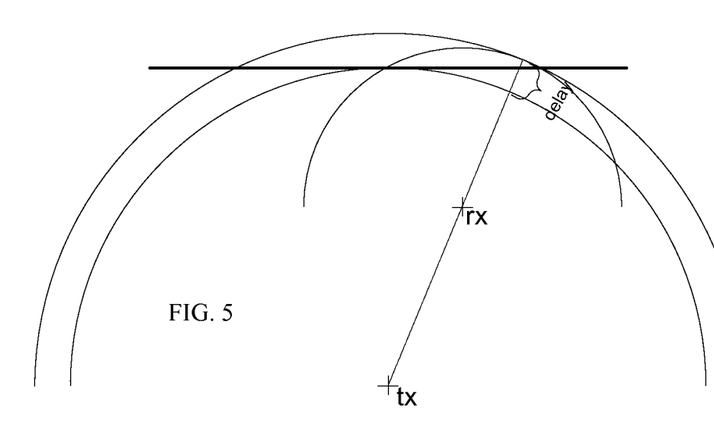
Figure 6:
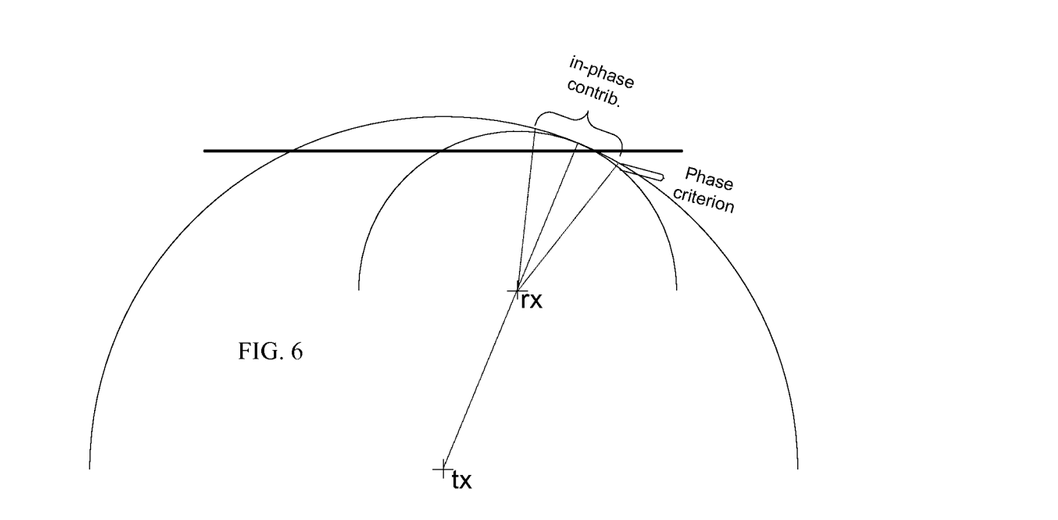
FIG. 6 is a graphical representation of one embodiment of a region of aperture contribution of a given transmit wavefront to a combination of coherent samples.

FIG. 5 shows the transmit wavefront evolved in time to achieve tangential intersection with the wavefront corresponding to the receive focus at time zero. This receive wavefront is also the proper reference for the focused transmit wavefront that should be synthesized. The temporal difference or shift is the offset. The angle to tangency line indicates the direction of the shift. The application of a time- or range-adjustment to the acquired component data effects the evolution in time.

The contribution of this component data is dominated by the lateral wave numbers corresponding to the tangential intersection shown. Practical acquisition sequences provide for multiple acquisition components that allow the full extent of the physical aperture to be reconstructed with in-phase synthesis components for most of the region of practical image acquisition. Using laterally spaced transmit foci, the region of the aperture associated with the intersection shifts along the aperture. Each set of data contributes components for different portions of the aperture (e.g., the location of intersection and immediately surrounding portion of the delay profile is at different locations along the transmit wavefront or aperture).

The offset determination is repeated for all receive foci and available acquisition components. By applying offsets to respective sets for each location, the different transmit delay profiles correspond to different regions of the transmit aperture. At the tangential intersection, the transmit delay profile has a slope similar to the slope of the receive delay profile. For example, by setting a criteria of ¼ wavelength disparity between the tangentially intersecting spherical wavefronts, an estimate of the region of support, or lateral bandwidth, of the aperture that is contributed by this component acquisition is set. FIG. 5 shows the in-phase contribution region of the aperture provided by one set of data. Larger or smaller wavelength criteria may be used.

The acquisition components are adjusted in terms of the time, or group delay, for the purpose of synthesis. By using a true time delay, an additional phase adjustment may not be needed to satisfy coherent synthesis. Where the coherent samples are shifted after demodulation, a phase adjustment may be used in act 22 to account for the demodulation. Phase adjustment may also be applied for other purposes, such as lateral interpolation.

In act 24 of FIG. 1, the retrospective focusing is completed by combining the aligned data. Coherent samples from two or more sets are combined for each location. The combination occurs after applying the offsets for retrospectively focusing. The samples representing a given location are each a function of a respective offset. The combination is a synthesis of coherent data prior to detection. In-phase and quadrature, radio frequency, or other data including phase information is combined. The resulting coherent sample is formed from signals received from multiple transmit-receive pulse echo receive events.

For each location, the different transmit delay profiles for the data being combined contribute to different regions of an aperture. The region of the aperture is a function of the transmit focal location. The region of the transmit aperture has a slope similar to a receive delay slope for the location. A lateral spectral bandwidth of the combined coherent samples is more linear than for the coherent samples before combining. The phase of the lateral spectrum of the combined coherent samples is more linear in frequency than for coherent samples before combining.

The combining is repeated for each location. Since the offsets are a function of the location, the samples being combined for one location may be associated with different offsets than the samples being combined for another location.

For a given location, fewer than all of the sets or associated transmit focal locations may contribute to the synthesis. For example, receive beams may not have been acquired for a given location. As another example, the region of lateral frequency support provided by a given transmit beam may correspond to an echo source location that is outside of the physical extent of the transducer array. In act 26, a number of the sets contributing data to be combined varies as a function of depth. The number is typically greater at shallow image depth and lesser at deeper image depth.

As the receive focus moves deeper, the region of support contributed for a given focus that is offset in beam steering from the receive focus moves outward. Eventually the region of support moves beyond the extent of the physical array or aperture. Such an acquisition may only or primarily contribute clutter and is not included in the synthesis operation.

The in-phase contribution of each candidate acquisition is considered in relation to the physical constraints of the transmit aperture and apodization used to acquire the data. Acquisitions not expected to contribute physically meaningful information are not used for a given depth. The number of sets contributing to a synthesis is modulated as a function of depth. In addition, by varying the synthesis weights, it is also possible to shape the round trip aperture function that results from synthesizing, effectively apodizing retrospectively. Such shaping of the aperture function may mitigate lateral sidelobes or may be controlled to whiten or produce a more flat-topped, round-trip aperture function with greater detail resolution.

As the receive focus moves deeper, the width of the region of support contributed by the remaining acquisition components increases. At the limit where the transmit and receive focal lengths are equal, the single acquisition component that aligns in beam steering with the receive focus contributes all available lateral wave numbers and no other components are needed. This equates to conventional confocal imaging. The full lateral bandwidth of round trip focusing is present in the single acquisition component, and therefore must be sampled laterally with greater density than the individual components acquired when the two focal lengths are disparate. This may be avoided by keeping the component transmit focus well outside of the imaging field of view. In one embodiment, the near field uses eight, sixteen, or other number of contributors or sets, and the far field uses two, three, or other number of contributors.

The simple geometrical arguments above apply equally well when the center of the transmit component wavefront, or focus, is behind the physical array. This situation is called a virtual point source transmit. The concept is not restricted to spherical wavefront transmit, though this case provides significant simplifications and seems well suited to the method. The principle of this method is not restricted to sector format.

Figure 7:
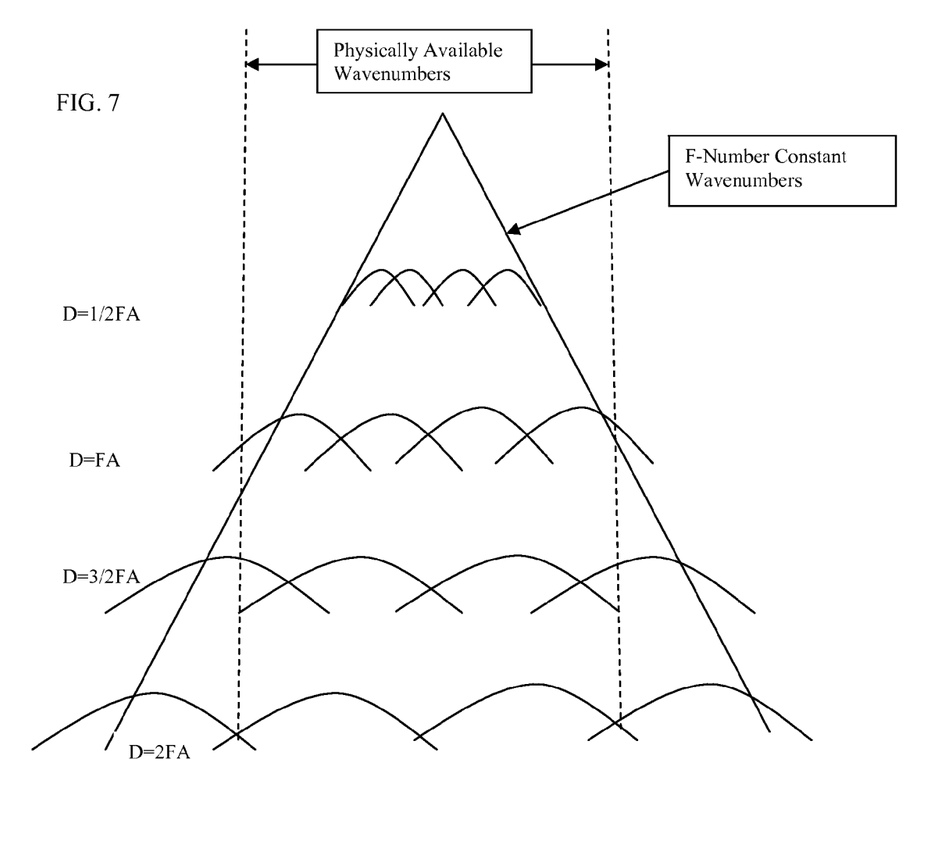
FIG. 7 is a graphical representation of the contribution of different sets of data as a function of depth in retrospective transmit focusing.

The combination of the offset data provides a synthesized aperture. The transmit design, which may be spherical or cylindrical (diverging, converging, or plane) wavefronts producing an imaging depth of field outside the field of view, is modeled with the scanning sequence, which may be a progressing group of multiple dynamically received beams whose beam steering surrounds the beam steering of transmit. FIG. 7 shows the synthesized transmit aperture function as it evolves with image depth. In the near field, a relatively constant F-number is achieved with a fixed synthesis count. As depth increases, the need for synthesis count to drop is illustrated as the remaining bandwidth of the remaining synthesis contributors increases to still cover lateral spectral content that is available due to the physical aperture.

In act 28, information is detected from the combined coherent samples. Any detection may be used. For example, the intensity or amplitude of response is determined with or without log compression. As another example, flow or motion may be estimated, such as with Doppler processing.

Prior to or after detection, other processes may occur. For example, other receive data may be interpolated from the synthesized coherent samples. As another example, filtering is applied.

In act 30, the detected data is low pass filtered and decimated. The low pass filtering and decimation may be used to match a downstream data rate or dataset size or display grid density limits. In other embodiments, act 30 is not provided, interpolation, or other processes are used.

In act 32, an image is generated using the combined data or retrospective focusing. The detected data, after any processing (e.g., filtering and decimation), is mapped to a display. Color and/or gray scale mapping is used. The detected information is mapped to display values. The image represents the field of view. The field of view is a tissue, bone, and/or fluid region in the patient.

Figure 8:
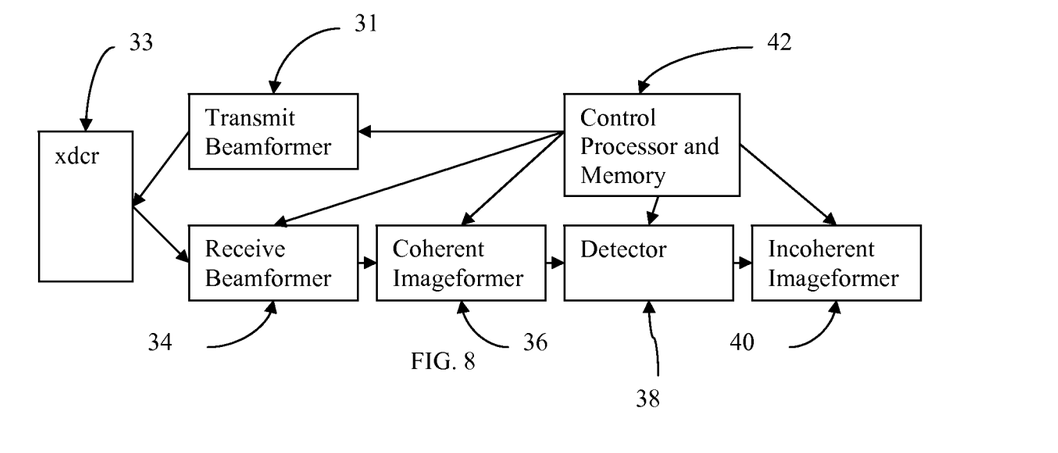
FIG. 8 is a block diagram of one embodiment of a system for retrospective transmit focusing in medical ultrasound imaging.

FIG. 8 shows one embodiment of a system for retrospective focusing. The system is an ultrasound imaging system, but other imaging systems using an array of elements may be used. The system includes a transducer 33, a transmit beamformer 31, a receive beamformer 34, a coherent imageformer 36, a detector 38, an incoherent imageformer 40, and a control processor and memory 42. Additional, different or fewer components may be provided, such as the system with a CINE memory, scan converter and/or display.

The transducer 33 is an array of a plurality of elements. The elements are piezoelectric or capacitive membrane elements. The array is configured as a one-dimensional array, a two-dimensional array, a 1.5 D array, a 1.25 D array, a 1.75 D array, an annular array, a multidimensional array, combinations thereof or any other now known or later developed array. The transducer elements transduce between acoustic and electric energies. The transducer 33 connects with the transmit beamformer 31 and the receive beamformer 34 through a transmit/receive switch, but separate connections may be used in other embodiments.

Two different beamformers are shown, a transmit beamformer 31 and the receive beamformer 34. While shown separately, the transmit and receive beamformers 31, 34 may be provided with some or all components in common. Both beamformers connect with the transducer 33. The transmit beamformer 31 is a processor, delay, filter, waveform generator, memory, phase rotator, digital-to-analog converter, amplifier, combinations thereof or any other now known or later developed transmit beamformer components. The transmit beamformer is configured as a plurality of channels for generating electrical signals of a transmit waveform for each element of a transmit aperture on the transducer 33. The waveforms have relative delay or phasing and amplitude for focusing the acoustic energy. The transmit beamformer 31 includes a controller for altering an aperture (e.g. the number of active elements), an apodization profile across the plurality of channels, a delay profile across the plurality of channels, a phase profile across the plurality of channels and combinations thereof. A scan line focus is generated based on these beamforming parameters.

The receive beamformer 34 is a preamplifier, filter, phase rotator, delay, summer, base band filter, processor, buffers, memory, combinations thereof or other now known or later developed receive beamformer components. The receive beamformer 34 is configured into a plurality of channels for receiving electrical signals representing echoes or acoustic energy impinging on the transducer 33. Beamforming parameters including a receive aperture (e.g., the number of elements and which elements are used for receive processing), the apodization profile, a delay profile, a phase profile and combinations thereof are applied to the receive signals for receive beamforming. For example, relative delays and amplitudes or apodization focus the acoustic energy along one or more scan lines. A control processor controls the various beamforming parameters for receive beam formation.

Receive beamformer delayed or phase rotated base band data for each channel is provided to a buffer. The buffer is a memory, such as a first-in-first-out memory or a corner turning memory. The memory is sufficient to store digital samples of the receive beamformer 34 across all or a portion of the scan lines from a given range. The beamformer parameters used by the transmit beamformer 31, the receive beamformer 34, or both are set for retrospective focusing. The beamformer parameters may be used as synthesis parameters for forming the component beams.

The receive beamformer 34 includes one or more digital or analog summers operable to combine data from different channels of the receive aperture to form a plurality of receive beams. Cascaded summers or a single summer may be used. In one embodiment, the beamform summer is operable to sum in-phase and quadrature channel data in a complex manner such that phase information is maintained for the formed beam. The receive beamformer 34 includes a parallel beamformer structure for forming a plurality of receive beams from the same received signals, such as forming tens or hundreds of receive beams with different delay profiles.

The transmit beamformer 31, transducer 33, and receive beamformer 34 form a pulse-echo acquisition subsystem. The acquisition subsystem gathers three types of data, namely spatial domain, temporal domain, and parameter domain data. The spatial domain data provides structural information in up to three spatial dimensions. The temporal domain data provides tissue motion and blood flow information. The parameter domain data provides information on the angle/frequency dependence of tissue response, or on the acoustic properties such as nonlinearity, stiffness, or other parameters.

To acquire data, the transmit beamformer 31 of the front-end subsystem transmits specially shaped and timed pulses into the body thousands of times per second. The receive beamformer 34 then generates multiple beams through parallel and real-time processing (e.g., interpolation of synthesized beams) of echoes received in response to each transmitted pulse. The number of receive beams the receive beamformer 34 generates in parallel determines the maximum information rate the imaging system can achieve.

The coherent imageformer processor 36 is a general processor, digital signal processor, control processor, application specific integrated circuit, digital circuit, digital signal processor, analog circuit, combinations thereof or other now known or later developed processors for performing line synthesis. In one embodiment, the coherent imageformer 36 is part of the receive beamformer 34 or control processor 36, but a separate or dedicated processor or circuit may be used in other embodiments. The coherent imageformer 36 includes memory buffers, complex multipliers and complex summers, but other components may be used.

The coherent imageformer 36 is operable to synthesize lines. For example, the coherent imageformer 36 is operable to form data representing a range of depths or lateral locations from different receive beams or combine data from different sub apertures to form one or more lines of data. Ultrasound lines are formed from receive beams formed by the receive beamformer 34. The synthesis may involve inter-beam phase correction as a first step. Multiple stages or parallel processing may be used to increase the throughput or number of receive beams processed for real-time imaging, such as associated with three- or four-dimensional imaging. The synthesis then combines the phase corrected beams through a coherent (i.e., phase sensitive) filter to form synthesized ultrasound lines.

In one embodiment, the coherent imageformer 36 includes pre-detection parameter synthesis, axial filtering for receive pulse shaping and decoding, phase correction to phase align receive beams in one or both of the lateral axes, beam- and range-dependent gain for spatial weighting and/or masking of beams (i.e., weighting receive beams outside a transmit beam region with a zero, such as for plane wave transmissions with a sector or Vector® receive format) and line synthesis. Parameter synthesis combines receive beams responsive to transmit beams of like focus. For example, the line synthesis is for phase inversion (receive beams associated with transmissions with different, such as opposite, phases), contrast pulse sequences (receive beams associated with transmissions at different amplitudes and/or phases), color flow, or other image forming processes coherently combining receive beams from distinct transmissions along a same scan line. Receive beams are combined for line synthesis after any phase correction. The combination is prior to detection or coherent. Any combination function may be used, such as summation, weighted summation or nonlinear combination of receive beams. The line synthesis is of receive beams responsive to transmit beams along different scan lines. As another example, the line synthesis is for combination of receive beams formed in response to distinct transmit events or formed from data for a same transmit event.

Additional, different or fewer components and associated functions may be provided by the coherent image former 36. Analytic beam interpolation forms new lines of data between receive beams from the same transmissions, or new lines of data between receive beams of different transmissions but with like characteristics, such as interpolation among data of similar transmit to receive beam steering offset. Analytic beam interpolation may increase the lateral sampling rate to prevent aliasing due to noncollinear event synthesis. Pre-detection lateral filtering provides lateral whitening or artifact reduction. Analytic line interpolation forms new lines of data between synthesized lines. Analytic line interpolation may increase the lateral sampling rate to prevent aliasing due to envelope detection.

The detector 38 is a general processor, digital signal processor, control processor, application specific integrated circuit, digital circuit, digital signal processor, analog circuit, combinations thereof or other now known or later developed processors for envelope detection.

The imageformer filters, synthesizes and compounds the multi-domain, multi-dimensional data acquired by the front-end into high quality images of one or more parameters of interest.

The amplitude detection and log compression stage separates the Imageformer into two important subsystems, namely the coherent imageformer 36, which is for the phase sensitive processing of analytic signals, and the non-coherent imageformer 40, which is for the phase insensitive processing of log-compressed amplitude (video) signals.

The coherent imageformer aligns the phase of the beams generated by the receive beamformer and applies coherent or phase-sensitive processing across phase-aligned beams. The coherent imageformer provides high quality multibeam operation through retrospective transmit focusing. The coherent imageformer captures the inter-beam phase information before being discarded by the amplitude detection stage of the imageformer. This allows the imaging system to preserve information and sustain high information rate while improving the image quality of multibeam operation.

The synthesis of lateral resolution after the beamformer is performed with a lateral interpolation stage and also reduces the transmit count to increase frame rate. This interpolation stage may be performed prior to the synthesis so that aliasing that would result from the greater synthesized bandwidth is avoided. Another lateral interpolation stage may be prior to the detector 38 in each dimension to allow for the bandwidth widening detection processes without aliasing.

In one embodiment, the coherent image former 36 performs range and phase adjustment to beam interpolation. The adjustments are performed as known for synthesizing additional receive beams. The analytic beam interpolation is performed. A further range and phase adjustment is provided for applying the offset for retrospective transmit focusing. The offset coherent samples are scaled and accumulated (synthesized) for the field of view.

In another embodiment, samples for multiple receive beams are stored in a buffer. The receive beams are actually received beams and/or interpolated beams. The offset is applied, and scaling and accumulation are performed. The samples for different locations are built up contributor by contributor. As receive beams for a single transmit are received, the receive beams are adjusted by the offsets per location, scaled, and combined with any previous samples representing the location.

Where the range adjustment (e.g., offset for transmit focusing) provides the capability to advance or retard the input signal with fractional precision and as a function of range independently for each data vector or ultrasound beam, the adjusted samples contribute to the accumulation. Phase adjust, likewise, is a range and vector dependent phase rotation applied to each synthesis constituent. The scaling of the input and possibly the output of the synthesis accumulation is also range and vector dependent.

In one embodiment, the offset is performed with a processor, such as a field programmable gate array. Another processor implements any analytic beam interpolation. The separate processor then applies the offset and accumulation.

The incoherent imageformer 40 is operable on detected data to combine incoherently multiple ultrasound lines. In one embodiment, the input to the incoherent imageformer 40 is the intensity data, and, in another, the input is log-compressed data. The ultrasound lines combined may have differing temporal or spatial spectra. Sequential focus stitching (e.g., zone cross-fade) may be performed in addition to frequency and spatial compounding. Any extra transmit events that are not synthesized coherently may be combined incoherently or compounded to reduce speckle and improve image uniformity.

In one embodiment, the incoherent imageformer 40 includes buffers, filters, summers, multipliers, processors or other components for implementing the compounding and/or other incoherent processes. For example, the incoherent imageformer 40 performs post-detection (video) axial filtering for receive pulse shaping, collinear multibeam spatial and/or frequency compounding, collinear transmit event compounding of corresponding collinear receive beams for transmit/receive frequency compounding, sequential focus, transmit focus compounding, or other purposes, noncollinear transmit event compounding of collinear receive beams for transmit/receive spatial compounding, post-detection lateral video filtering for lateral response shaping or artifact reduction, and adaptive gain, compression and mapping. Different, fewer or additional incoherent processes may be provided.

In one embodiment, each coherent image former 36 and each incoherent imageformer 40 are operable for a limited number of channels, such as a group of 16 channels. A plurality of devices is provided for each group of channels. The outputs may then be used to synthesize further data or provide further incoherent combinations. In one embodiment, the incoherent imageformer 40 is provided with a feedback from the detector 38 for compounding detected data.

The images or receive beams combined coherently or incoherently are on a same acoustic or scan grid. Alternatively, a spatial transformation or scan conversion aligns the component beams or associated images. The data is output as an one-, two-, or three-dimensional representation on the display. Other processes, such as the generation of text or graphics may also be performed for generating an image on a display. For example, a display dynamic range is set, filtering in space and time using a linear or nonlinear filter, which may be an FIR or IIR filter or table-based, is provided, and/or the signal amplitude is mapped to display values as a function of a linear or non-linear map. The non-linear map may use any of various inputs, such as both filtered and unfiltered versions of the data being input in selecting a corresponding brightness. Data optimized for contrast may be input with the same or similar data optimized for spatial resolution. The input data is then used to select brightness or display intensity.

As part of the image forming process, the control processor 42 sets a scan pattern or acquisition sequence, number of simultaneous receive beams, a number of sequential beams, a number of sub apertures, a number of focal zones in a same scan line, a number of component beams compounded together, receive multiple beam parameters, combination function, component beam temporal frequency response, component beam spatial frequency response, a number of sets contributing to retrospective transmit focusing by depth, scan line density, focal locations, combinations thereof or other now known or later developed parameters for coherent combination by the coherent imageformer 36. The parameters are set as a function of received ultrasound data and/or user input. The received ultrasound data is from any where along the processing path, such as from the receive beamformer 34, the coherent imageformer 36, the detector 38 or the incoherent detector 40.

The instructions for implementing the adaptive processes, methods and/or techniques discussed above are provided on computer-readable storage media or memories, such as a cache, buffer, RAM, removable media, hard drive or other computer readable storage media. The instructions are implemented on a single device, such as the control processor 42, or a plurality of devices in a distributed manner. Computer readable storage media include various types of volatile and non-volatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

An example embodiment of the instructions for retrospective or dynamic transmit focusing is provided. The number of transmit beams may be limited by motion and the number of simultaneously received receive beams. The number of receive beams per transmit beam may depend on the hardware bandwidth. The number receive beams and their spacing determines the synthesized F-number on transmit. In one example, the hardware samples at 56 MHz with a 3.5 MHz per beam sampling rate and achieves F 3 transmit synthesis with 15 receive beams. Other combinations are possible, such as a higher system sampling rate and lower per beam sampling to lower the synthesis F-number.

The receive beams are spaced according to 1-way Nyquist for the available receive aperture ($\lambda$/Aperture, e.g. 1.54 mm/us/(3.1 MHz*19 mm)=1.5 degrees. The transmit beams are advanced according to 1-way Nyquist spacing for the to-be synthesized available transmit aperture (e.g. same as above). The frame rate is set due to transmit spacing determination (e.g. for 1.5 degree translation, providing about 80 Hz at 160 mm) Assuming equal transmit and receive available aperture, the synthesis configuration has a slip of one.

Analytic beam interpolation is used to provide an even greater number of receive beams. The sampling is at the receive Nyquist, and analytic beam interpolation provides for well sampled round trip signal synthesis. The synthesis count (i.e., number of combined samples per location) is at a minimum of two (i.e., two or more at the deepest depth in the field of view). The minimum count may be one (i.e., confocal imaging), but the lateral sampling requirement becomes 2-way, yielding a frame rate penalty. A round-trip focus is provided for each location, and a higher frame rate than that resolution would imply is provided because approximately half the lateral resolution is created in the imageformer.

With a minimum synthesis count of two, the transmit aperture is synthesized as Fnum=maxDepth/Aperture. In the near field, data steered out to the angle indicated by the minimum synthesized F-number is used. These angles are provided by large (e.g., eight or more) receive beam counts. The minimum synthesized transmit Fnumber (txFmin) for a given number of receive beamformer beams available (Nrxb) and receive beam spacing s is given by the formula txFmin=½ cotan(½ Nrxb*s), or for small angles approximately 1/(s*Nrxb). (e.g. txFmin=2.35, or approximately 2.39 for Nrxb=16, s=1.5 deg (0.026 rad from A=19, $\lambda$=1.54/3.1)). By the geometry of the "look angle" for the progressing transmit focus, the transmit focus position that provides synthesis of the full extent of the transmit aperture (A) for a given synthesis count (N) at the maximum display depth (D) for 1-way Nyquist beam spacing s (radians) is given by the formula TxDepth=A*D/{A−D*(N−1)s} (e.g. TxDepth=205 mm for A=19 mm, D=160 mm, N=2, s=1.5 deg(0.026 rad)). The formula is approximate, as D*(N−1)s is an arc length treated as a line segment for similar triangles, and it does not consider obliquity. The virtual point source falls out of this transmit focus depth equation when D*(N−1)s>A.

The bandwidth of lateral frequencies that is contributed by each acquisition is related to how close the curvature of the desired or synthesized wavefront (equal to receive focus wavefront) is to the transmit wavefront for that acquisition event. A rule, such as about ¼ cycle or stationary phase integral approach, is used to model the contribution of each transmit to the synthesized aperture. For deeper depths, the synthesis count goes down, but the lateral bandwidth contributed by each acquisition goes up. The transmit beams may be chosen so that, at the maximum depth, the synthesis count of two provides about the available lateral bandwidth of transmit separation between the two contributors.

For an even higher frame rate, the transmit steering may be made to progress as the field of view is scanned by more than a would be indicated by the one way Nyquist criterion based on transmit aperture. Greater transmit beam coverage is then required, and the quality of the effective synthesized transmit apodization may be compromised. Very high frame rates can be achieved while preserving high resolution, albeit at the expense of other image quality metrics.

The above instructions are one example. Other examples with different frequencies, counts, or other retrospective transmit focus parameters may be used.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed:

1. A method for retrospective dynamic transmit beamformation in medical ultrasound imaging system, the method comprising:

transmitting first and second transmit beams with different transmit delay profiles having static first and second foci, respectively, the first focus different than the second focus;

generating first and second sets of multiple receive data in response to the first and second transmit beams, respectively, each of the receive data having coherent samples representing at least overlapping locations;

for each of a plurality of overlapping locations, applying an at least one cycle delay offset to at least one of the coherent samples, the offset being a function of the first focus and a receive focus for the coherent sample;

aligning the data with the offset, the offset corresponding to a temporal shift in one of the transmit delay profiles to a tangential intersection with receive wavefronts for the data;

combining coherent samples from the first and second sets for each location after applying the offsets, the coherent samples representing each location being a function of the offset; and the different transmit delay profiles having different regions of an aperture having slopes similar to a receive delay slope for the location; and generating an image the image being a function of the combined coherent samples; wherein one of the transmit delay profiles corresponds to temporal evolution of a spherical or cylindrical transmit wavefront to achieve the tangential intersection with one of the receive wavefronts corresponding to a receive focus from an initial time when the receive focus is formed.

2. The method of claim 1 wherein the first and second foci have different lateral positions.

3. The method of claim 1 wherein a lateral spectrum of the combined coherent samples is linear phase over a greater range of frequencies than for the coherent samples before combining.

4. The method of claim 1 wherein a number of the sets contributing data to be combined varies as a function of depth.

5. The method of claim 1 wherein a field of view of the image is between a transducer used for the transmitting and the first and second foci, the first and second foci being outside the field of view and within four times a depth of the field of view.

6. The method of claim 1 further comprising phase aligning the coherent samples for each location prior to the combining.

7. The method of claim 1 further comprising:
  detecting information from the combined coherent samples; and
  low pass filtering and decimating the information;
  wherein the image is a function of the filtered and decimated information.

8. The method of claim 1 further comprising weighting the coherent samples prior to the combining, weights being a function of a transmit apodization profile.

9. A method for retrospective dynamic transmit beamformation in medical ultrasound imaging system, the method comprising:
  transmitting a plurality of transmit beams with different transmit delay profiles having different foci;
  generating sets of multiple receive data in response to the respective transmit beams, each of the receive data of a set having coherent samples representing different locations in a field of view, at least one receive sample of each receive beam set is common among the sets;
  for each location, applying an offset to at least one of the coherent samples;
  aligning the data with the offset, the offset corresponding to a temporal shift in one of the transmit delay profiles to a tangential intersection with receive wavefronts for the data;
  combining coherent samples from the sets for each location after applying the offsets, a number of sets contributing data to be combined varying as a function of depth; and the different transmit delay profiles having different regions of an aperture having slopes similar to a receive delay slope for the location; and
  generating an image representing the field of view, the image being a function of the combined coherent samples wherein one of the transmit delay profiles corresponds to temporal evolution of a spherical or cylindrical transmit wavefront to achieve the tangential intersection with one of the receive wavefronts corresponding to a receive focus from an initial time when the receive focus is formed.

10. The method of claim 9 wherein transmitting comprises transmitting the plurality with the different foci in different lateral positions, and wherein the number is greater for a near field than a far field of the field of view.

11. In a computer readable non-transitory storage medium having stored therein data representing instructions executable by a programmed processor for retrospective transmit beamformation in medical ultrasound imaging system, the storage medium comprising instructions for:
  transmitting a plurality of transmit beams with different transmit profiles having different foci;
  generating sets of multiple receive data in response to the respective transmit beams, each of the receive data having coherent samples representing locations in at least a same region;
  for each location, retrospectively focusing the transmit beams to the location by altering the coherent samples;
  aligning the data with the offset, the offset corresponding to a temporal shift in one of the transmit delay profiles to a tangential intersection with receive wavefronts for the data;
  combining coherent samples from the sets for each location after retrospectively focusing; and
  generating an image, the image being a function of the combined coherent samples wherein one of the transmit delay profiles corresponds to temporal evolution of a spherical or cylindrical transmit wavefront to achieve the tangential intersection with one of the receive wavefronts corresponding to a receive focus from an initial time when the receive focus is formed.

* * * * *